H. MOHR.
UNIVERSAL CONNECTION.
APPLICATION FILED MAR. 13, 1920.
1,381,214.
Patented June 14, 1921.
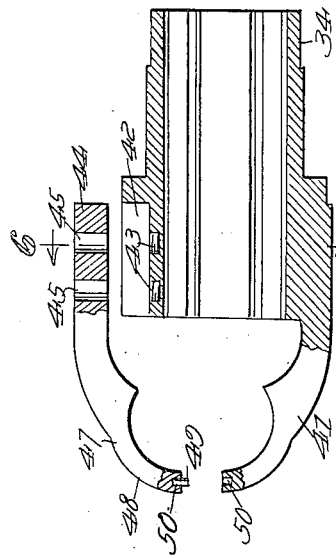
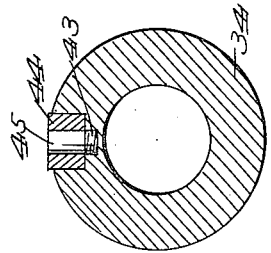
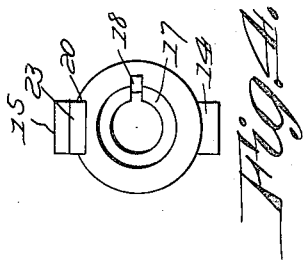
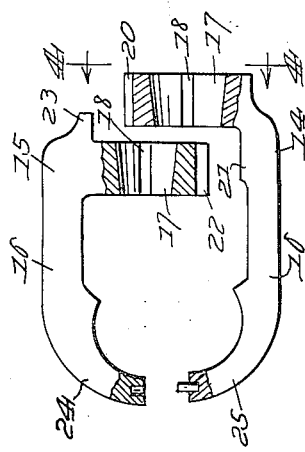
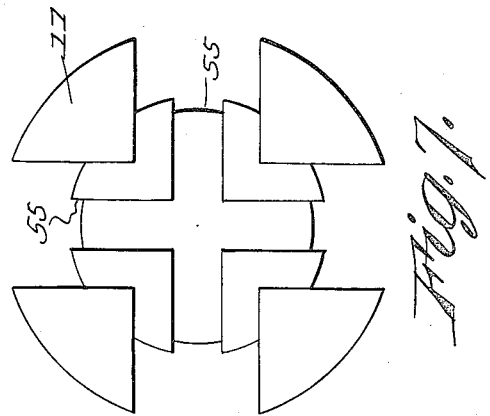
Inventor
Henry Mohr
By
Watson E. Coleman
Attorney

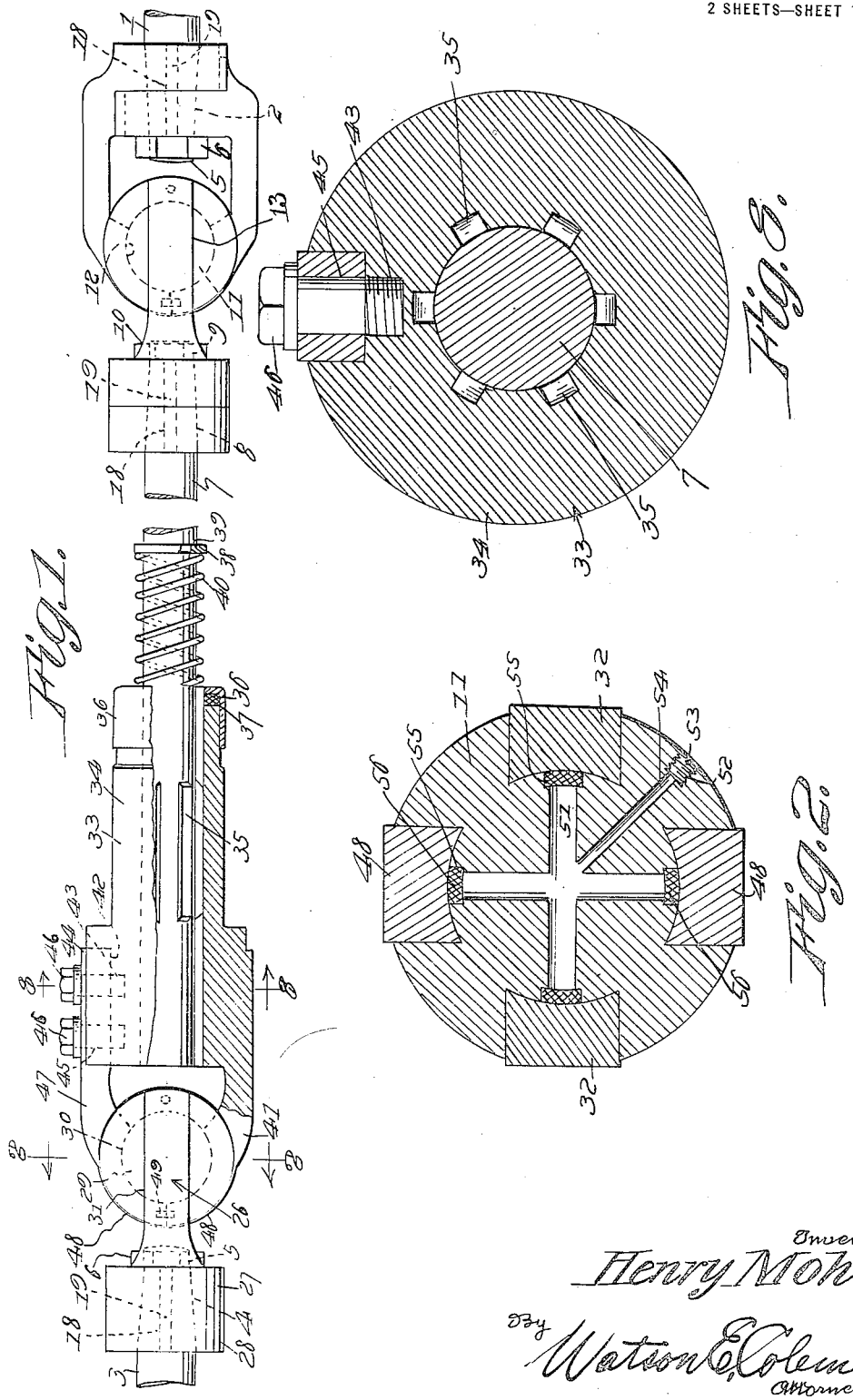

UNITED STATES PATENT OFFICE.

HENRY MOHR, OF COVINGTON, KENTUCKY.

UNIVERSAL CONNECTION.

1,381,214.  Specification of Letters Patent.  Patented June 14, 1921.

Application filed March 13, 1920. Serial No. 365,580.

*To all whom it may concern:*

Be it known that I, HENRY MOHR, a citizen of the United States, residing at Covington, in the county of Kenton and State of Kentucky, have invented certain new and useful Improvements in Universal Connections, of which the following is a specification, reference being had to the accompanying drawings.

This invention relates to an improved universal connection, especially adapted for use between the transmission and the differential at the rear of an automobile. This connection comprises a plurality of universal joints, and one or more of these universal joints may also be disposed for use between the engine and the transmission.

As a general object, the invention aims to provide a universal connection, which, when once assembled and applied to an automobile, a positive drive from the transmission to the differential without rattling of the parts is assured.

As a further object it is the aim to provide a device capable of being cheaply made and sold at a reasonable profit.

A further object resides in a device so constructed as to be positive in its transmission of power and designed whereby the various parts may be put together and secured to prevent their loss.

A still further and important object embodies the provision of a split universal joint between several shaft sections, whereby the universal connection may be applied to automobiles now in use, without in any way disassembling any parts of the automobile with the exception of first removing the old shafting.

Additionally the invention aims to provide a universal connection of this general character wherein split universal joints are provided adjacent the transmission and the differential including a solid shaft section between the joints, thereby insuring an efficient, practical and positive drive from the transmission to the differential at the rear drive axle of the automobile.

Furthermore, it is the aim to provide split joints at the aforesaid locations, including spherical bearing members with intersecting guides for the arms of the separable members of the split joints to permit universal movements. The spherical members are provided with means to permit thorough lubrication of the parts, whereby easy and smooth driving actions may be assured.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view of the universal connection constructed in accordance with the invention, and showing the slip joint of the shaft sections and illustrating certain of the universal split joints, Fig. 2 is a sectional view on line 2—2 of Fig. 1, Fig. 3 is a view of the separable parts of one of the split joints, Fig. 4 is a view taken on line 4—4 of Fig. 3, Fig. 5 is a view of the separable parts of one of the joints at the left of the universal connection, Fig. 6 is a view taken on line 6—6 of Fig. 5, Fig. 7 is an enlarged detail view in elevation of one of the spherical elements of one of the joints, and Fig. 8 is a view taken on line 8—8 of Fig. 1.

Referring more especially to the drawings 1 designates a shaft section which may merge into the differential casing, for gear connections with the differential, and if desired may connect with the transmission gearing. This shaft section has a tapered end 2; and 3 denotes another shaft section, which in the present instance, merges into the transmission casing, for gear connections with the transmission. It is obvious that this shaft section may, if desired, be connected to the differential. In other words, the shaft section 2 may be substituted for the shaft section 3 and vice versa. In further words, the universal connection may be reversed to that illustrated, namely turned end for end, if desired.

The shaft section 3 has a tapered part 4, which is similar to the tapered part 2. The tapered parts 2 and 4 of the shaft sections 1 and 3 are threaded as at 5, to receive the nuts 6. The universal connection also includes an intermediate shaft section 7, one end of which is tapered as at 8, and threaded as at 9 for the reception of the nut 10.

The universal split joint nearest the differential comprises a ball or spherical member 11, which is provided with grooves 12 and 13, extending at right angles to each other as shown. It is to be noted that each of the universal joints is entitled "split joint" because it comprises the separable parts 14 and 15 having arms 16. The bodies of the separable parts 14 and 15 are circular and are disposed concentrically with each other. These circular bodies have central openings 17, which receive the tapered part 2 of the shaft section 1. The central openings 17 of the bodies 14 and 15 are provided with grooves 18, to receive a rib 19 formed on the tapered part 2 of the shaft section 1 to prevent the circular bodies 14 and 15 from turning relatively to the shaft section 1. The circular body 14 on its outer surface at a point diametrically opposite its arm 16 has a groove 20 to be engaged by a part 21 of the arm 16 of the body 15. The circular body 15 has a groove 22 formed thereon diametrically opposite the arm 16 of the body 15 to receive the projection 23 of the circular body 14, thereby fixing the two bodies relatively to each other. When the bodies 14 and 15 are mounted upon the tapered part 2 of the shaft section 1, the nut 6 is threaded to the tapered end 2, to hold the bodies wedged upon the shaft section. The universal split joint adapted to be nearest the differential comprises two sets of circular bodies 14 and 15 and arms 16.

One set is carried by the shaft section 1, while the other set is carried by the intermediate shaft section 7, and it is to be noted that these two sets of circular bodies are disposed relatively to each other so that their arms extend toward each other but are positioned at right angles to each other. The bodies are disposed in this manner so that the shoes 24 of the arm 16 of one set of circular bodies will engage the grooves 12 of the ball or spherical member, while the shoes 25 of the arms of the other set of circular bodies will engage and ride in the grooves 13 of the ball or spherical member, so that the intermediate shaft section 7 may have universal movements relatively to the shaft section 1 and vice versa. The circular bodies of the arms having the shoes 25 are wedged upon the tapered end 8 of the intermediate shaft section 7 in a manner similar to the circular bodies 14 and 15 of the arms having the shoes 24; therefore the connections with the tapered end 8 of the shaft section 7 are designated by the same numerals.

The universal split joint 26, preferably adapted for use nearest the transmission, includes the separable circular bodies 27 and 28 similar to the circular bodies 14 and 15, and which are wedged upon the tapered end 4 of the shaft section 3 and held thereto by the nut 6. The circular bodies 27 and 28 have tongue and groove connections 17, 18 and 19 with the tapered part 4 of the shaft section 3. The universal split joint 26 also includes a ball or spherical member 29 having the right angle annular grooves 30 and 31, similar to the grooves 12 and 13. The shoes 32 of the arms 16 of the circular bodies 27 and 28 engage the groove 31 of the spherical member 29.

The shaft section 7 has a slip or sliding joint 33 with the spherical member or ball 29. This slip joint 33 comprises a sleeve 34, which has a plurality of rib and groove connections 35 with the shaft section 7, to permit the sleeve 34 to move slightly axially with relation to the shaft section 7. A cap 36 is fitted over the sleeve 34, there being a felt washer 37 interposed between the cap and the end of the sleeve 34. A split washer or ring 38 is mounted in a groove 39 of the shaft section 7, and interposed between the split washer or ring 38 and the cap 36 is a coil spring 40, thereby acting to move the shaft section and the sleeve 34 in opposite directions. In fact the spring permits a longitudinal yielding movement between the sleeve and the shaft section, in order to accommodate the movements of the parts of the body of the automobile, in riding over rough roads. It is known that in passing over rough roads, the various parts of an automobile vibrate, and tend to flex or move relatively to each other. In order to accommodate these relative movements, the shaft section 7 is permitted to move longitudinally with relation to the sleeve 34. The sleeve 34 has a projecting arm 41 similar to the arms 16 of the circular bodies 14 and 15. The sleeve 34 at a point diametrically opposite where the arm 41 is formed is provided with an elongated recess 42, the bottom of which has threaded depressions 43. A plate 44 fits into the recess 42 and has openings 45 to register with the threaded depressions 43, whereby screw bolts 46 may be employed for securing the plate 44 in said recess. The plate 44 has an arm 47, which is diametrically opposite the arm 41. These arms 41 and 47 are similar to the arms 16 previously described and have shoes 48, which engage the grooves 30 of the spherical member or ball 29. By means of the shoes 48 and the shoes 24, 25 and 32, the shaft sections 1, 3 and 7 are capable of universal movements relatively to each other, owing to these grooves moving in their respective grooves of the spherical members or balls at the opposite ends of the shaft section 7. Suitable dowel pins are arranged between the adjacent ends of the shoes which engage the grooves of the spherical members or balls 11 and 29, to hold the shoes in position, and to prevent relative movement. These dowel pins 49 engage recesses 50 between the adjacent ends of the shoes. It will be noted that the shoes of the arms 16 and of the arms 41 and 47 are not of lengths corresponding to the lengths of the spherical members. In fact the shoes are shorter, thereby permitting movement of the shoes in the grooves so that the shaft sections may move universally relatively to each other. The ball of each universal split joint is provided with oil ducts 51 extending radially. These oil ducts are disposed in order to supply lubricant to the grooves formed in the ball or spherical member. These ducts merge into a single duct 54, the outer end of which terminates in an enlargement 52 to receive a cap 53. By removing this cap lubricant may be supplied to the duct, which will permit the lubricant to pass to the bottoms of the grooves in the ball. The bottom of each groove has a recess 55, to receive a felt ring or washer 56, to absorb and retain the lubricant since the ducts 51 communicate with the bottoms of these grooves 55. By this method of lubricating the shoes of the arms, they are capable of easy universal movements, and will permit shaft sections to have positive but smooth and easy driving actions.

The invention having been set forth, what is claimed as new and useful is:—

1. In a universal connection, a driving shaft section and a shaft section to be driven, a universal joint connecting said shaft sections, said joint comprising separable parts arranged in pairs, one pair connected to each shaft section and disposed in a plane at right angles to the other pair, a spherical member having grooves at right angles to each other, the bottoms of which have relatively narrow counter-grooves, the interior of the spherical member having intersecting ducts connecting with the counter-grooves and adapted to receive lubricant, the separable parts of each pair having arcuate shoes engaging the first grooves, whereby the shaft sections may relatively flex, means connecting the adjacent ends of the shoes of each pair of separable parts to prevent relative displacement of the ends, and circular felt rings engaging the counter-grooves for absorbing and supplying lubricant to the arcuate surfaces of said shoes.

2. In a universal connection, a driving shaft section and a shaft section to be driven, the adjacent ends of both sections being tapered, said tapered ends having integral keys, a universal joint connecting said shaft sections, said joint comprising separable parts arranged in pairs, one pair at right angles to the other pair, certain ends of the parts of each pair having laterally projecting overlapping extensions, said extensions provided with tapered registering openings receiving the tapered ends of the sections and provided with grooves receiving said keys for preventing relative rotation of the lateral extensions on the tapered ends of the shaft sections, means for holding said lateral extensions on the tapered ends, a spherical member having grooves at right angles to each other, the other ends of the separable parts of each pair having arcuate shoes engaging said grooves of the spherical member, and means connecting the adjacent ends of the shoes of each pair of parts.

3. In a universal connection, a driving shaft section and a shaft section to be driven, a universal joint connecting the adjacent ends of said shaft section, one of the adjacent ends being tapered, said joint comprising separable parts arranged in pairs, one in a plane at right angles to the other and connected to one of the sections, the separable parts of the other pair having laterally projecting overlapping extensions, said extensions provided with tapered registering openings receiving the tapered end of one of said shaft sections, said openings and the tapered end having groove and key connections to prevent relative rotation of the lateral extensions, means for holding the lateral extensions on said tapered ends, and means universally connecting the adjacent ends of both pairs of separable parts.

In testimony whereof I hereunto affix my signature.

HENRY MOHR.